United States Patent [19]

Moritz

[11] 4,336,232
[45] Jun. 22, 1982

[54] PRODUCTION OF PURIFIED BRINE
[76] Inventor: George J. Moritz, Rte. 4, Box 126, Clarks Summit, Pa. 18411
[21] Appl. No.: 176,686
[22] Filed: Aug. 8, 1980

Related U.S. Application Data
[63] Continuation of Ser. No. 896,379, Apr. 14, 1978, abandoned.
[51] Int. Cl.³ .......................... C01F 5/22; C01F 11/18
[52] U.S. Cl. .................................... 423/164; 210/290; 210/726; 210/794; 423/165
[58] Field of Search ...................... 423/161, 164, 165; 210/274, 275, 290, 726, 794

[56] References Cited
U.S. PATENT DOCUMENTS 3,900,395  8/1975  Hirs ..................................... 210/290
4,038,365  7/1977  Patil et al. ........................... 423/164
4,048,068  9/1977  Hirs ..................................... 210/290
4,102,786  7/1978  Okada et al. ........................ 210/290
4,115,219  9/1978  Gancy et al. ........................ 423/165

Primary Examiner—O. R. Vertiz
Assistant Examiner—Wayne A. Langel
Attorney, Agent, or Firm—Craig and Antonelli

[57]  ABSTRACT

A process for the purification of salt brine having magnesium and calcium hardness includes the steps of treating a saturated salt brine containing magnesium and calcium ions with an alkali metal carbonate and an alkali metal hydroxide in a preselected sequence and in amounts in excess of stoichiometric proportions to form firm, readily settleable, filterable floc precipitate particles of insoluble compounds of magnesium and calcium, suspended in the treated brine and passing the resultant suspension to a filtering unit to separate and remove the floc precipitate and to provide a purified salt brine.

21 Claims, 3 Drawing Figures

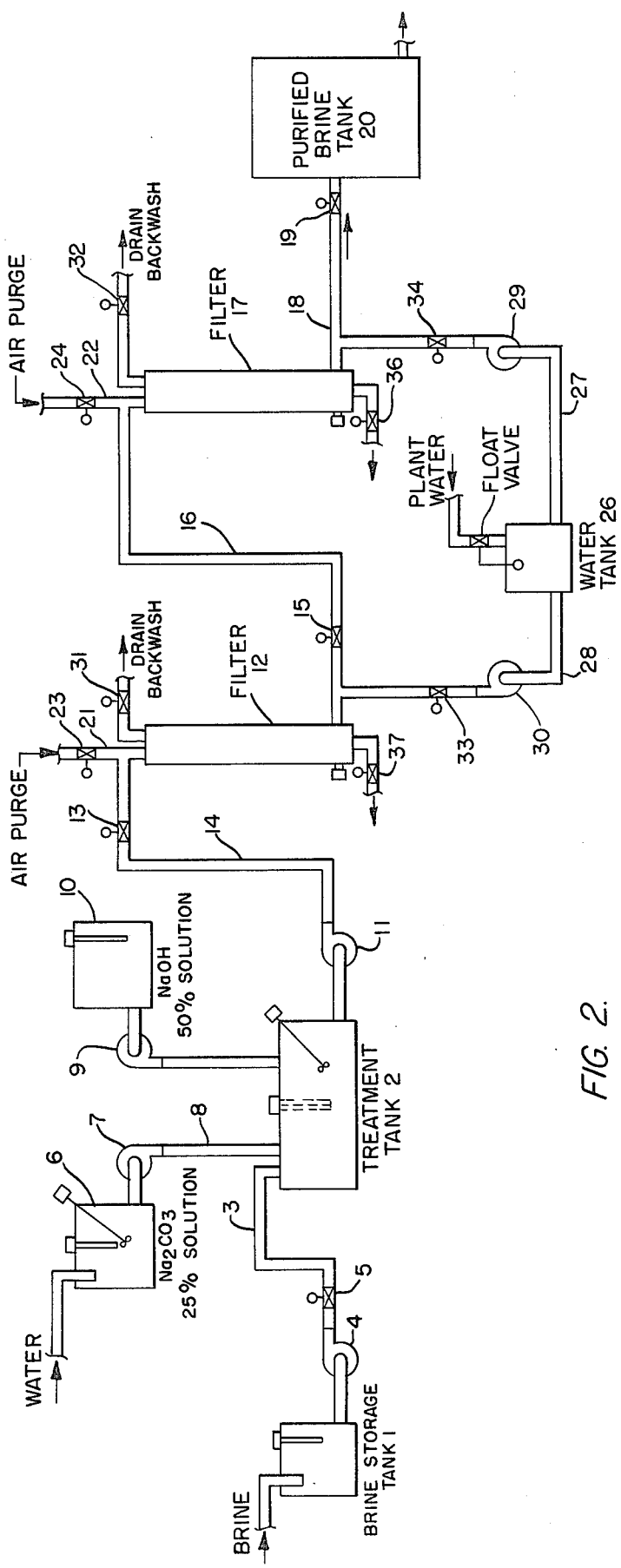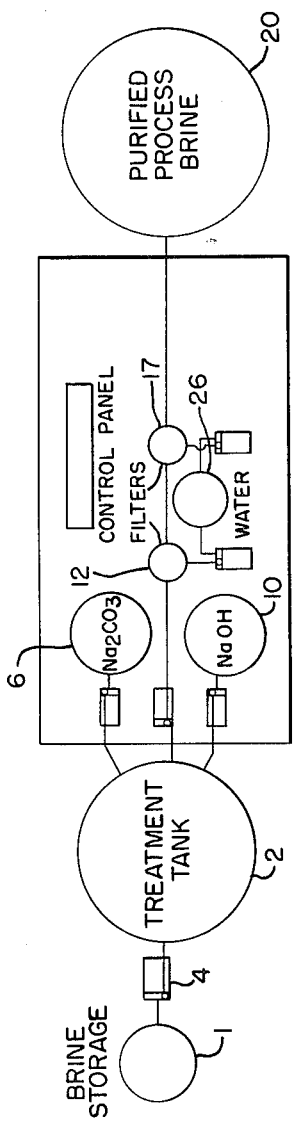

PRODUCTION OF PURIFIED BRINE

This is a continuation of application Ser. No. 896,379, filed Apr. 14, 1978 now abandoned.

This invention relates to the purification of salt brine, and in particular, to a process and apparatus wherein salt brine is treated to reduce the combined calcium-magnesium hardness of the brine to an acceptable level.

Heretofore, there have been many proposals for effecting the purification of salt brine wherein one or more impurities, such as calcium sulfate and magnesium sulfate, as well as other inorganic compounds are removed, in part, from the salt brine. For example, U.S. Pat. No. 1,999,709 discloses a process for removal of calcium sulfate from a salt brine obtained as a waste liquor from the ammonia-soda process by forming a precipitate comprising the salt of calcium in the brine. In one embodiment, the process involves producing in the brine a precipitate of an insoluble inorganic calcium salt, such as calcium carbonate or calcium phosphate, equal in weight to at least ten times the weight of the calcium sulfate originally contained in the brine by reaction of calcium present in a form other than the calcium sulfate so that the calcium sulfate present is co-precipitated from the brine together with the insoluble calcium salt. The patent also discloses that the calcium carbonate precipitate is formed by introducing calcium hydroxide into the brine and, while the calcium hydroxide is present, further introducing carbon dioxide into the brine to convert calcium hydroxide to calcium carbonate.

U.S. Pat. No. 3,128,248 discloses another method for the purification of brine which comprises adding at least one member of the group of sodium hydroxide, slaked lime and calcium carbonate to the brine having magnesium and calcium ions to convert the magnesium ion into a magnesium hydroxide precipitate and the calcium ion into a calcium carbonate precipitate while introducing air under pressure at ambient or elevated temperature into the brine; decreasing the pressure to generate bubbles of air in the brine, thereby elevating the precipitated finely divided magnesium hydroxide and calcium carbonate particles up to the surface of the brine by being entrained in the bubbles of air and separating the magnesium hydroxide and calcium carbonate particles by skimming from the surface of the brine.

With regard to separation of the magnesium ion by this patented process, it has been found that soda ash consumption was high and that the magnesium ion concentration was substantially unaffected.

This patent also discloses that it was known heretofore that brine can be treated with sodium hydroxide, slaked lime or sodium carbonate to convert to magnesium ion to magnesium hydroxide and the calcium ion to calcium carbonate and that these materials can be separated in the form of a fine precipitate. It is further indicated that this prior art method has the disadvantages of requiring an apparatus for the precipitation and separation process which is very large in size and which must be in the production cycle for long periods of time, especially in large scale treatment of large volumes of sea water. The particles of the resulting magnesium hydroxide are described as being so fine that precipitating velocity is low and a comparatively long period of time is required for concentration by settling of the magnesium hydroxide. As to this prior art method, it has been found that the $Mg(OH)_2$ formed is so fine that it is almost impossible to settle.

A more recently issued patent, that is U.S. Pat. No. 3,751,559, discloses another process for treating an aqueous solution of crude sodium chloride that contains mercury wherein before removal of magnesium and calcium, which contaminate the crude sodium chloride, chlorine or sodium hypochloride is added to the solution to control the concentration of free chlorine therein, to prevent mercury from precipitating with the magnesium and calcium. In column 3 of this patent, beginning with line 22, it is stated that the crude sodium chloride solution obtained from rock salt is admixed with caustic alkali and alkali carbonate in an amount sufficient to precipitate magnesium and calcium contained in the crude sodium chloride solution, respectively, and that caustic alkali and alkali carbonate may be added in the sequence of firstly caustic alkali and then alkali carbonate or alternatively these materials may be added simultaneously. The patent further states, in describing the data presented in FIG. 2 and in the examples, that sodium hydroxide and sodium carbonate are added to the crude sodium chloride solution in amounts necessary to precipitate the magnesium ion $(Mg++)$ and the calcium ion $(Ca++)$ as magnesium hydroxide and calcium carbonate, respectively.

Other patents which disclose the treatment of sodium chloride or calcium chloride and sodium chloride containing brines with alkaline materials to form precipitates which may be subsequently separated are U.S. Pat. Nos. 2,021,501; 2,032,702; 2,404,550 and 3,463,814. The treatment processes described in these patents require the use of a plurality of settling tanks and/or at least one evaporator to effect the necessary separation of one or more of the components from the raw brine.

Advantageously, this invention provides a process and apparatus for treating of salt brine to effect purification wherein the need for an evaporator or a plurality of settling tanks is avoided. Also, the prolonged periods of time usually associated with purification of the brine to effect the necessary reduction in calcium-magnesium hardness are unnecessary while still obtaining purified brine having substantially reduced calcium and magnesium hardness, i.e. less than about 50 ppm, and often less than 10 ppm, expressed as ppm calcium on a wet basis.

This invention effects purification of salt brine by treating the calcium and magnesium inherent in the brine, for example, rock and solar salt brine, with excess soda ash $(Na_2CO_3)$ and excess caustic soda (NaOH) in a batch-type operation. During this operation, raw saturated brine is introduced into a treatment/settling tank and treated with chemicals, i.e. soda ash is added and allowed to react, then caustic soda is added to the resulting admixture and allowed to react. The resulting treated brine is taken from treatment/settling tank and passed through at least one filtering unit to a treated brine storage tank. Subsequently, the treatment/settling tank is refilled with a raw brine and treated with the chemicals, while the filtering unit is purged of brine, backwashed with water to remove the precipitated impurities and purged of wash water. At the end of this cyclic operation, the filtering unit is ready for effecting another treatment cycle.

More particularly, this invention contemplates a cyclic batch-type process for effecting purification of a raw salt brine containing calcium and magnesium ions which comprises introducing a preselected amount of saturated raw brine liquid into a treatment/settling tank, adding soda ash to the brine in an amount in excess of stoichiometric to react with the calcium ions and to form a first precipitate; then admixing caustic soda with the contents of the tank in an amount in excess of stoichiometric to react with the magnesium ions and to form a second precipitate that combines with the first precipitate thereby forming a firm floc that settles easily, the contents of the tank being agitated during the addition of the soda ash and caustic soda to cause the precipitated calcium and magnesium, in the form of a floc, to suspend throughout the treated brine, and thereafter passing the resulting suspension to at least one filtering unit wherein the suspended floc is removed from the treated brine and the treated brine is passed to a treated brine storage tank.

The raw brine to be processed or treated in accordance with the present invention may have a combined calcium and magnesium hardness expressed as ppm calcium in the range of from about 100 to 4,500 ppm.

It has been found that treating this saturated brine with stoichiometric quantities of soda ash and caustic soda, in accordance with the prior art practice, is not effective in reducing the combined hardness of the calcium and manganese to below about 50 ppm, expressed as ppm calcium. Advantageously, in accordance with the present invention, it has been found that when the excess soda ash is raised to at least 0.6 grams per liter, and preferably 0.8 to 1.0 grams per liter, and the excess caustic soda is raised to at least 1.0 grams per liter, and preferably 1.0 to 2.0 grams per liter, the soda ash-calcium and caustic-magnesium reaction proceed rapidly and a separable and firm floc can be formed in a total period of from about 50 to 70 minutes; although longer times up to for example 120 minutes may be employed. (If, however, less than 1.0 gram per liter of caustic soda is employed then the time to complete the treatment is on the order of from 3 to 4 hours). In contrast to the present invention, in using stoichiometric proportions of the soda ash and caustic soda, a period on the order of about 18 hours or more is necessary in order to obtain a noticeable reduction in the hardness, i.e. on the order of 40 to 60 ppm expressed as ppm calcium. It is also of importance not to use too much excess soda ash in that it has been found that soda ash in excess of 2.5 grams per liter stoichiometric creates a fine floc which settles slowly and is difficult to filter. Although brine purity is not effected by this excess, the operation of the process is severely curtailed because of this fine gelatinous floc. Advantageously, the same effect has not been found with excess caustic soda since the caustic soda reaction goes to completion within about 5 to 10 minutes; whereas the soda ash reaction is longer and takes about 50 to 60 minutes. Advantageously, the rapidity of the caustic reaction and the presence of a floc which has already been formed by the soda ash-calcium reaction assures large settleable and filterable magnesium hydroxide floc.

It will also be appreciated that in accordance with the present invention, the order of addition of the caustic soda and soda ash into the treatment tank is of considerable importance. If the soda ash is introduced first and allowed to react, and the caustic soda is then added, the floc that is formed is firm and settles easily. However, if the caustic is introduced first, it reacts with any magnesium and then when soda ash is added to react with the calcium the floc that is formed is light and sticky and hard to filter. Therefore, in accordance with one embodiment of the present invention, it is preferred that the soda ash be added first at 0.6 gram per liter excess and allowed to react for approximately 1 hour. Then, caustic soda is added at 1.8 gram per liter excess and allowed to react for approximately 10 minutes. This sequence of operation produces a brine from solar salt that has less, when filtered, than 5 ppm total hardness, that is calcium and magnesium.

In the purification of salt brine in accordance with this invention, the brine is preferably treated with sodium carbonate (soda ash) to convert the calcium ion $(Ca++)$ to calcium carbonate and with caustic soda (sodium hydroxide) to convert the magnesium ion $(Mg++)$ to magnesium hydroxide and the resultant flocculant, as heretofore noted, is separated by filtration. In order to overcome the disadvantages of the prior art and to provide a readily separable firm floc, predetermined amounts of sodium carbonate and sodium hydroxide in excess of stoichiometric proportions are metered into the brine. The reactions involved during the treatment of the brine are represented by the following equations:

$$Na_2CO_3 + CaSO_4 \rightarrow Na_2SO_4 + CaCO_3 \downarrow$$

$$2NaOH + MgSO_4 \rightarrow Na_2SO_4 + Mg(OH)_2 \downarrow$$

It will be recognized that the calcium and magnesium ions may be presented in the form of other soluble salts, e.g. $CaCl_2$ or $MgCl_2$. Also, it is known that other impurities, including various metals are present in the brine; the concentrations of these impurities are described in the literature, e.g. "The Occurrence of Impurities in Rock Salt, Solar Salt, and Purified Sodium Chloride" by Arthur Bloomberg et al., *Journal of the Electrochemical Society*, Vol. 10, No. 1, January 1959. In general, these impurities are present in such low concentrations that there is no adverse effect on the process of this invention.

Generally, the soda ash and the caustic soda are added to the treatment/settling tank in the form of aqueous solutions. The quantities of soda ash and caustic soda in the solutions to be added to the brine are usually preset. The solutions are added in quantities determined by pre-analysis of the hardness of raw brine, i.e. the combined calcium-magnesium hardness. If the magnesium and calcium levels exceed certain predetermined levels during a given batch treatment, there would be a possibility that enough caustic soda and soda ash will not be available in the mixer units to fully treat the raw brine. Accordingly, in accordance with a further embodiment of the invention, samples of the raw brine are periodically taken from the storage tank containing the saturated sodium chloride brine and the hardness is determined. It will be appreciated that the salt brine may be processed by a Sterling Lixator, a Sterling Brinopak, or a Brinomat to provide the raw feed stock brine. The salt for forming the brine can be either solar salt, northern rock salt, southern rock salt, or a granulated salt, such as the commercially available granulated salt produced by International Salt Company. Once the combined manganesium calcium hardness has been determined, then it is possible for the operator of the process to make the necessary adjustments in metered amounts of each of the caustic soda and the soda ash solutions added to the brine. The solutions are usually set at concentrations which have been found to be sufficient for the treatment of a variety of different types of salt brines. For example, it has been found that a 25% soda ash solution and a 50% caustic solution provide particularly workable solutions for the purposes of the present invention. Advantageously, the floc formation is conducted under ambient conditions of temperature and pressure.

It should also be understood that the process of the present invention is directed only to reduction of calcium and magnesium hardness. Other impurities such as barium, iron, heavy metals and sulfates of other metals will not be treated. If these impurities are present in the brine feed stock, there impurities will pass together with the brine to the final storage tank for the treated bring. The necessary amount of each of the solutions is metered by pumps into the treatment tank.

In the treatment/settling tank, the excess soda ash is initially admixed with a predetermined amount of the salt brine and is allowed to react for a set period of time to allow formation of calcium carbonate precipitate. Subsequently, the caustic solution is added to the treatment tank to cause the formation of magnesium hydroxide precipitate and the resultant admixture is continuously agitated for sufficient period to ensure thorough mixing of the contents and substantially complete reaction of the calcium and magnesium ions. The floc precipitate settles towards the bottom of the tank and is widthdrawn together with the treated brine via a pump and associated feed conduit to a filtering unit. It will be recognized that the treatment/settling tank is usually provided with a skimmer that facilitates removal of the floc precipitate from the tank.

The filtering unit employed in the process of this invention uses a filter bed made up of one or more particulate filtering aids. One suitable bed is formed by a combination of garnet (8 to 25 mesh), zircon (25 to 60 mesh), and anthrafilt (14 to 35 mesh). These filtering aids are arranged in three separate, equal volume layers, with the arrangement of the layers being determined by the specific gravity of each of the filtering aids, that is the more dense layer being arranged at the bottom and the less dense layer arranged at the top, with the other filtering aid being arranged as an intermediate layer. Although one or a plurality of filtering units may be employed, it is preferable to use two filtering units arranged in series. The use of two filtering units enables the filtering operation to remove floc particles down to 0.45 microns while permitting filter rates of from 1 to 5 gallons per minute per square foot with a filtering capacity of about 500 to 1,000 gallons per square foot before backwashing with water is necessary. It will be understood that because of the sizing of the three filtering aids and their density, the filter beds automatically separate into three layers and that during backwashing these layers become intermixed. After the backwashing cycle, the filtering aids settle into three distinct layers again. This effect happens as soon as backwashing ceases.

The process of this invention is usually operated through five separate and distinct cycles. In the first cycle of operation, the raw brine is fed from the storage tank into the brine treatment/settling tank. In the second cycle, the required amounts of soda ash and caustic soda are admixed with the brine within the treatment tank and allowed to react and preferably to settle. The resultant treated brine containing suspended floc particles is passed through the filtering unit or units to a purified brine storage tank. In the third cycle of operation, after all of the treated brine has been removed from the treatment/settling tank, the filtering unit or units are isolated from the treatment tank by appropriate valve means, and compressed air under a pressure of from 20 to 50 psi is introduced into each filtering unit to cause the brine trapped within the filter bed to be purged and passed into the purified brine storage tank. After the brine purge cycle, the flow of air into the system is stopped in the fourth cycle of operation and backwash water is introduced opposite to the filtering direction to each of the filtering units. This water is passed through filter beds to remove the accumulation of floc precipitate and to form a suspension which is removed from the system via appropriate drain conduits. In the fifth and final cycle, compressed air is again introduced into the filtering units to cause the water retained within the filtering bed during the backwash water cycle to be removed and to place the beds in condition for the next brine treatment and filtering cycle. For example, the processing of 4,000 gallons of raw brine having a total hardness of 100 to 3,500 ppm, the total period required for carrying these five cycles of operation will be approximately 8 hours, with each cycle of operation being as follows:

| | |
|---|---|
| (1) brine feed fill | 160 minutes |
| (2) brine treatment and filtering | 180 minutes |
| (3) brine purge | 5 minutes |
| (4) backwash water | 135 minutes |
| (5) wash water purge | 5 minutes |

It will be appreciated that the periods of time needed for brine treatment and filtering stages are governed by the chemical aspects, i.e. concentration of the treating chemical and the make-up of the brine; whereas the other periods are primarily governed by the physical aspects, i.e. design of the apparatus, usually a total cycle of approximately 8 hours is selected so that the operators of the process can work on the normal shifts of operation.

One particularly advantageous embodiment of the present invention is the provision of an apparatus for carrying out the process of the present invention, which apparatus can readily be assembled into a compact and portable system. The system can be mounted on a large transportable platform so that the entire brine treatment system can, if desired, be transported pre-assembled to a predetermined industrial site. Thus, it should be understood that because of the cyclic batch-type operation of the present process and because the process does not require the use of a plurality of settling tanks and evaporators to achieve the necessary reduction in the calcium-magnesium hardness, the apparatus for carrying out this process is uncomplicated and is readily adaptable to be arranged in a preassembled system.

This invention therefor is also directed to an apparatus for carrying out the purification of salt brine containing calcium and magnesium ions which comprises a single treatment/settling tank adapted to contain a predetermined amount of salt brine to be treated, a first mixer unit for forming a solution of soda ash in a predetermined concentration, a second mixer unit for forming a caustic soda solution of predetermined concentration, means for metering the contents of the first mixer unit and the second mixer unit in succession into the treatment/settling tank to effect a two-stage precipitation within said tank, agitator means for mixing the entering soda ash and caustic soda solutions with the brine to form a suspension of floc precipitant within said treatment/settling tank, filtering means for filtering the suspended floc out of the brine, means for conveying the admixture of treated brine and suspended floc to the filtering means, and means for passing the filtered treated brine from the filtering means to a purified brine storage unit. In addition, the apparatus if provided with control means for effecting cyclic operation of said treatment/settling tank and said filtering units by predetermined actuation and deactuations of the valves, pumps and other equipment, whereby said apparatus is capable of carrying out a brine feed cycle, a brine treatment-filtering cycle, a brine purge cycle, a backwash water cycle, and a water purge cycle in the appropriate sequence.

Advantageously, the filtering means of the present invention includes two series arranged filtering units, each of which is provided with a bed having three layers of different filtering aids so that the bed is capable of rapidly removing the suspended floc precipitant from the treated brine layers, which as heretofore described are, respectively, made-up of zircon, garnet and anthrafilt, a water inlet is provided for each unit so that the layers are fluidized and are intermixed during the backwashing with water that is introduced countercurrent to the flow of the treated brine containing the suspended floc. During backwashing the filtering and particles abrade against each other to remove the sticky floc that has adhered to the particles during the filtering stage. The backwashing water is introduced into the filtering unit via a perforated inlet device, e.g. a spherical screen that distributes the water into a plurality of separate and distinct streams.

The process and apparatus of this invention will be further understood from the following detailed description and accompanying drawings wherein:

FIG. 1 is a schematic diagram showing the arrangement of the processing units required for carrying out the process of the present invention;

FIG. 2 is a plan view of a typical arrangement of the processing units of the present invention on a portable skid or platform.

Figure 3:
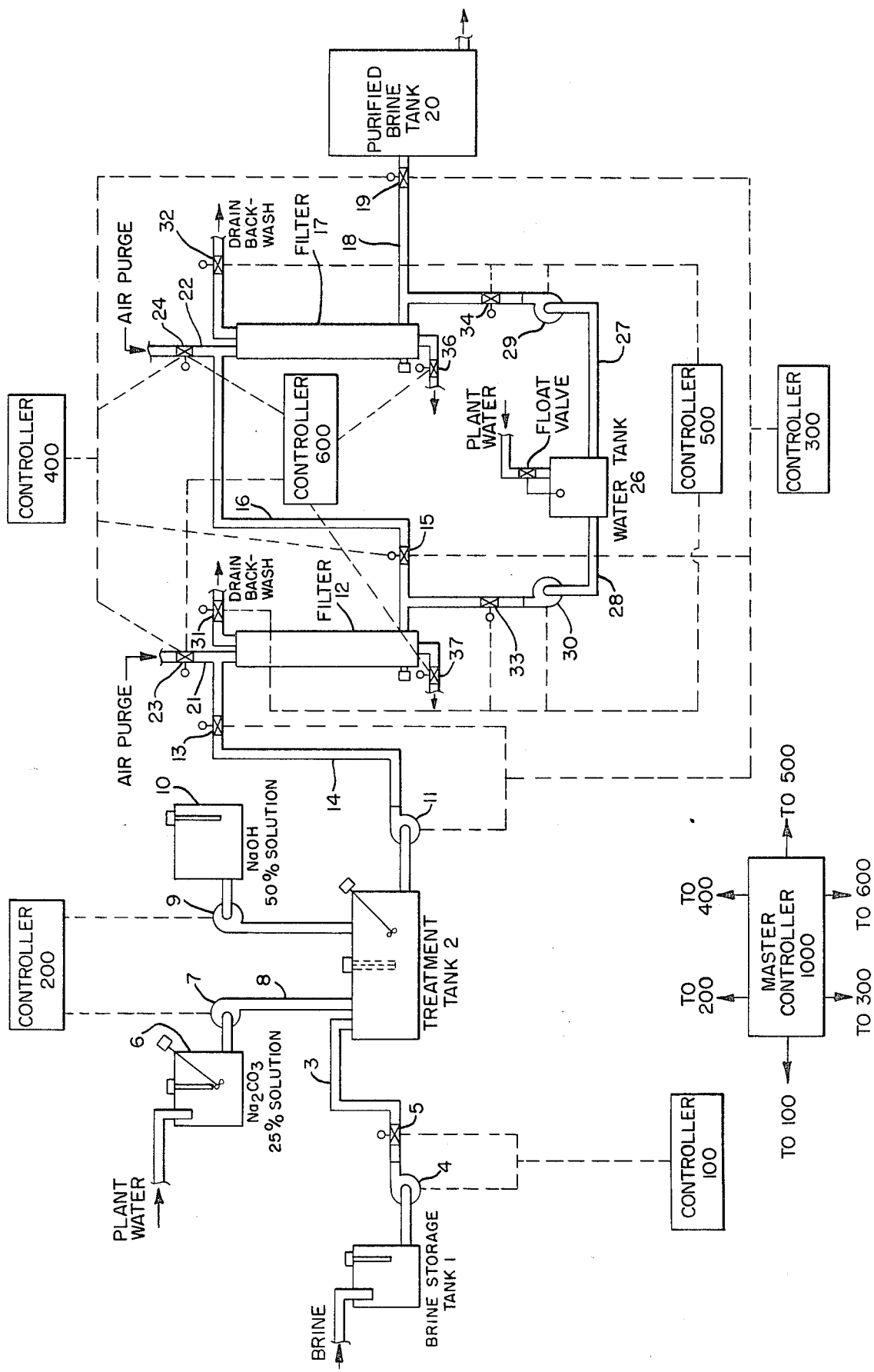
FIG. 3 is a schematic diagram showing the arrangement of the control means for effecting the sequence of operations required by the process of the present invention.

In the system shown in FIG. 1, saturated brine is introduced into brine storage tank 1 and during the initial start-up of the process a preselected amount of brine is introduced into treatment tank 2 through conduit 3 via pump 4 and valve 5.

A soda ash solution is prepared in mixer unit 6 and a predetermined amount of this solution is introduced into the treatment tank 2 via metering pump 7 and conduit 8. After a predetermined period of time, metering pump 9 is energized to withdraw a predetermined amount of sodium hydroxide solution from unit 10 into the treatment tank. After sufficient time to allow formation of a floc precipitate containing the manganese and calcium ions within the brine, pump 11 is actuated to cause withdrawal of the treated brine containing suspended particles of floc precipitate from the treatment tank into a first filter unit 12 via valve 13 and conduit 14. This brine is passed downwardly through filter unit 12 and is discharged via valve 15 and conduit 16, and introduced into the top of a second filter unit 17 for further filtering and removal of the suspended floc precipitate. Each filter unit contains a multi-layered filter bed composed of particulate filter aids. The filtered and purified brine is removed from the bottom of filter unit 17 via conduit 18 and is introduced via valve 19 into the purified brine tank 20. After all of the treated brine has been removed from the treatment tank and passed through each of the filter units 12 and 17, pump 11 is de-energized and valve 13 is closed. Then, purified brine retained in the bed of filter unit 12 is removed by an air purge introduced via open valve 23 and conduit 21, valve 15 is then closed and purified brine remaining in filter unit 17 is removed by an air purge introduced via conduit 22 and valve 24; the air passing through the filter units and causing the brine to discharge via conduits 16 and 18 to the purified brine tank. Subsequently, valve 24 is closed and valve 19 is closed. Then, backwash water is introduced from water tank 26 via conduits 27 and 28 and pumps 29 and 30 into the lower portion of each of the filter units 12 and 17 to cause the wash water to flow upwardly through each of the filter units. The backwash water is removed from the upper portion of each of the filter units via drain lines 31 and 32, respectively. During this cycle of operation, valves 13, 15, 19, 23, 24, 36 and 37 are closed and valves 31, 32, 33 and 34 are open. Subsequently, another air purge cycle is effected to remove the wash water from each of the filter beds via drain valves 36 and 37. At the end of this purge cycle, the apparatus is again ready for another complete cycle of operation.

In FIG. 2, there is a typical arrangement of the process units used to carry out the process of the present invention on a portable skid or other suitable platform. It will be understood that the treatment tank and purified brine tank may be arranged on the same platform as the other units or these units may be provided as permanent installations at the industrial site. Alternatively, both of these tanks may be mounted on a separate platform which can be placed adjacent to the platform supporting the mixer units and the filtering units and the associated control system for effecting the desired cyclic operation.

FIG. 3 further illustrates the control means required for effecting the desired sequence of operation of the purification process. It will be recognized that the valve means employed in the system of the present invention may be pneumatically or electrically operated, and that in the embodiments illustrated, the valves are electrically operated solonoid valves.

In FIG. 3 the necessary cyclic operation of the apparatus is effected by a master controller 1000 which is connected electrically or pneumatically to the auxiliary controllers 100, 200, 300, 400, 500, and 600. At start-up, controller 100 is actuated to run pump 4 and open valve 5 to fill the treatment tank 2 with a predetermined amount, i.e. batch, of salt brine to be purified. The controller deactivates pump 3 and valve 5 and controller 200 is operated to introduce the $Na_2CO_3$ and then the NaOH into the brine in the proper amounts and in the required sequence to insure formation of a readily filterable floc precipitate containing the calcium and magnesium to be removed. Controller 200 is then deactuated and the treated brine is introduced into the series arranged filter units 12 and 17 by controller 300. In this phase of operation, pump 11 is energized and valves 13, 15 and 19 are opened. After filtration, pump 11 is stopped and valves 13, 15 and 19 are closed by controller 300. The controller 400 then effects an air purge of each of the filter units to remove purified brine by appropriate actuation of valves 22 and 24 and valves 15 and 19.

Thereafter, controllers 500 and 600 act, successively, to cause backwashing of the filter units and another air purge to remove the wash water from the filter units.

It should also be recognized that in accordance with the process of the present invention, a number of other reagents, which, in theory, should act similarly to the soda ash and caustic soda, may be employed. It will be appreciated that in place of sodium, other monovalent alkali metals may be used to introduce a water soluble carbonate into the treatment/settling tank. For example, potassium or lithium carbonate may be employed, although sodium carbonate is preferred because of its reactivity, its lower cost as well as availability. Likewise, other hydroxides, such as potassium and lithium hydroxide, may be used. Here again, due to its known reactivity and cost and availability, sodium hydroxide is preferred.

It should also be recognized that appropriate control means, including alarms, level controls and pH meters, may be used in appropriate locations to ensure that the process of the present invention operates in a desired cyclic batch-type operation.

Additional aspects of the process of the invention will be further understood from the following examples, wherein a number of different salt brines, containing magnesium and calcium ions, were treated in an apparatus as illustrated in FIG. 1 to provide a purified brine having a combined magnesium-calcium hardness of approximately 50 ppm or less, expressed as ppm calcium.

In Examples 1 to 6, a pilot plant unit was used to treat 100 gallons of salt brine with a total cycle for treatment and filtering of about 250 minutes; whereas in Examples 7 to 11, a larger commercial size plant was used to treat approximately 4,000 gallons of the salt brine with a treatment-filtering cycle of approximately 8 hours. The salt brines were treated in a cyclic manner using two filtering units having a filter bed composed of equal volume parts of garnet, zircon and anthrafilt. In the smaller pilot plant, the bed had dimensions of $3''\phi \times 24''$ high and in the larger plant, the bed had dimensions of $24''\phi \times 24''$ high In determining the hardness of the salt brine before and after treatment, the following procedure was employed:

Samples for tests were obtained from the raw brine storage tank or from the filtered brine tap. For examples taken from the raw brine storage tank, no pH adjustment is necessary. However, the samples taken from the tap after the brine filters, the pH will be approximately 10.5 to 12.5 and must be adjusted to a pH of 10 with hydrochloric acid.

Sample size for the hardness test is 100 ml. saturated brine.

The following reagents and equipment are needed:
0.01 Molar EDTA
Hall Hardness Indicator (Solution A)
Dilute Hydrochloric Acid
Graduated Burette
100 milliliter Cylinder
250 milliliter Erlenmeyer Flask
pH Meter
pH 10 Buffer Solution In order to effect the necessary pH adjustment a 100 milliliter sample is taken and placed in a flask. The pH meter is calibrated with pH 10 buffer solution and then the probe is rinsed with distilled water and placed in the sample. The pH should read approximately 10.5 to 12.5. Using a dilute HCl solution, add HCl drop-wise until pH drops to 9.9–10.1. If too much HCl is added and the pH drops below 9.9, discard sample and start again.

The total hardness is determined as follows: A burette is filled to zero mark with 0.01 molar EDTA. The burette is checked to make sure that it has no air bubbles in solution which could interfere with accuracy. 10 drops of Hall hardness indicator is added. The sample should then turn a rosey pink. Titration is then effected with 0.01 molar EDTA until a clear blue endpoint is reached. With this indicator, color change is from rosey pink through purple to clear blue endpoint. Endpoint should be stable for at least 5 minutes. In order to calculate the total hardness, 1 milliliter of 0.01 molar EDTA is equal to 0.04 milligrams of calcium. Therefore, in order to convert milliliters EDTA to ppm total hard-

EXAMPLES 1-11

| Example No. | Salt Brine Feed Stock | Raw Brine Hardness (ppm) | | Treated Brine Hardness (ppm) | | Treated Brine Total Hardness expressed ppm Calcium | Added NaOH (gram) | Added Na$_2$CO$_3$ (gram) | Batch Size Gallons |
|---|---|---|---|---|---|---|---|---|---|
| | | CaSO$_4$ | MgSO$_4$ | Ca++ | Mg++ | | | | |
| 1 | Bonaire Solar | 120 | 109 | 2.0 | 0 | 2 | 870 | 419 | 100 |
| 2 | Bonaire Solar | 120 | 109 | 2.6 | 0 | 2.6 | 870 | 419 | 100 |
| 3 | Retsof Rock | 740 | 14 | .98 | 1.97 | 4.3 | 827 | 793 | 100 |
| 4 | Retsof Rock | 740 | 14 | 51.80 | 1.90 | 54.9 | 1009 | 702 | 100 |
| 5 | Retsof Rock | 740 | 14 | 2.62 | 5.05 | 10.9 | 553 | 702 | 100 |
| 6 | Retsof Rock | 740 | 14 | .66 | 2.94 | 5.5 | 827 | 702 | 100 |
| 7 | Avery Rock | 4,220 | 379 | 6 | 2 | 9 | 30,418 | 68,720 | 3,820 |
| 8 | Bonaire Solar | 5,699 | 560 | 2 | 1 | 4 | 34,069 | 93,006 | 4,000 |
| 9 | California Solar | 1,290 | 1,186 | 7 | 2 | 10 | 43,797 | 19,963 | 4,200 |
| 10 | Arizona Evaporated | 68 | 66 | 3 | 0 | 3 | 28,723 | 13,387 | 4,100 |
| 11 | Detroit Rock | 1,413 | 494 | 4 | 1 | 6 | 31,773 | 30,697 | 3,819 |

From the above tabulation of data, it will be observed that this invention provides a process for the purification of salt brine wherein the time required for treating a given batch of brine is substantially reduced, the combined magnesium-calcium hardness is consistently reduced to an amount on the order of 50 ppm and often less than 5 ppm, expressed in ppm calcium.

ness brine, the following equation is used:

Milliliters EDTA $\times 0.4 \times 100 \div 1.2 =$ ppm calcium total hardness

While I have shown and described only certain embodiments in accordance with the present invention, it is understood that the same is not limited thereto, but is susceptible of numerous changes and modifications as known to those skilled in the art, and I therefor do not wish to be limited to the details shown and described herein, but intend to cover all such changes and modifications as are encompassed by the scope of the appended claims.

What is claimed is:

1. A process for the purification of a raw salt brine having magnesium and calcium hardness, which comprises introducing a predetermined amount of a raw saturated salt brine that contains magnesium ions and calcium ions in known concentrations into a treatment tank, introducing a solution of alkali metal carbonate in a predetermined concentration into said treatment tank to react with the calcium ions and to form a first precipitate containing calcium carbonate; after a predetermined time to allow flocculation of said first precipitate, introducing a solution of an alkali metal hydroxide in a predetermined concentration into said treatment tank to react with the magnesium ions and to form a second precipitate containing magnesium hydroxide, said first and second precipitates together forming a filterable floc precipitate containing calcium and magnesium; directly transferring the contents of said treatment tank to a filter device and filtering out the filterable floc precipitate in said device and passing the filtered saturated brine from the filter device to a storage unit; from 0.6 g/l to 1.0 g/l of the alkali metal carbonate being introduced in excess of stoichiometric proportions of the calcium ions to said salt brine and from 1.0 g/l to 2.0 g/l of the alkali metal hydroxide being introduced in excess of stoichiometric proportions of said magnesium ions to said salt brine whereby said filterable floc precipitate particles can be formed within a period of not more than two hours after introduction of said alkali metal carbonate into said saturated salt brine.

2. A process according to claim 1, wherein the total hardness of the purified filtered brine is approximately 50 ppm expressed as ppm calcium.

3. A process according to claim 2, wherein said raw salt brine contains from 20 to 500 ppm of magnesium ions and from 20 to 5,000 ppm of calcium ions.

4. A process according to claim 3, wherein the raw salt brine is admixed with the alkali metal carbonate for a period of 40 to 60 minutes before the introduction of the alkali metal hydroxide and thereafter the resulting admixture is agitated and allowed to further react for a period of 5 to 10 minutes.

5. A process according to claim 4, wherein the floc precipitate formed after addition of both the alkali metal carbonate and the alkali metal hydroxide has a particle size of from 0.45 to 1.0 micron.

6. A process according to claim 1, wherein the purification of the raw salt brine is effected in a batch-type cyclic operation in which in the first cycle of operation the raw salt brine is fed into the treatment tank; in the second cycle the alkali metal carbonate and the alkali metal hydroxide are successively introduced into the treatment tank and allowed to react and then the contents of the treatment tank are passed directly via conduit means through the filter device in one direction to provide the filtered saturated brine which is passed to the storage unit; in the third cycle of operation the filter device is purged of retained brine by introducing a flow of air into one end of the filter device; in the fourth cycle a backwash water is introduced into the filter device in a direction opposite to said one direction to remove an accumulation of floc precipitate from the filter device; and in the fifth cycle air is introduced into the filter device to remove the water retained during the fourth cycle of operation.

7. A process according to claim 6 wherein said five cycles of operation are effected within a period of about eight hours.

8. A process according to claim 1, wherein said filter device includes at least one filtering unit provided with a filter bed having three layers of different particulate filtering aids in equal volumes, the upper layer being anthrafilt, the intermediate layer being zircon, and the bottom layer being garnet.

9. A process according to claim 1, wherein said filterable floc precipitate particles are formed within a period of not more then two hours after introduction of said alkali metal carbonate into said saturated salt brine.

10. A process according to claim 1, wherein said alkali metal carbonate is soda ash and said alkali metal hydroxide is caustic soda.

11. A process for the purification of salt brine having magnesium and calcium hardness which comprises treating a saturated salt brine containing magnesium and calcium ions initially with an alkali metal carbonate and then with an alkali metal hydroxide in amounts in excess of stoichiometric proportions to form firm, readily settleable, filterable floc precipitate particles of insoluble compounds of magnesium and calcium, suspended in the treated brine; passing the resultant suspensions to a filtering unit to separate and remove the floc precipitate and to provide a purified salt brine; from 0.6 g/l to 1.0 g/l of the alkali metal carbonate being added in excess of the stoichiometric proportions to said salt brine and from 1.0 g/l to 2.0 g/l of the alkali metal hydroxide being added in excess of stoichiometric proportions to said salt brine the treatment with the alkali metal carbonate and then with the alkali metal hydroxide being capable of forming said filterable floc precipitate particles within a period of not more than two hours after introduction of said alkali metal carbonate into said saturated salt brine and filtering the resultant suspension of filterable floc precipitate particles with said filtering unit to provide said purified salt brine.

12. A process according to claim 11, wherein the alkali metal carbonate is added to a given batch of the salt brine prior to the addition of the alkali metal hydroxide, the alkali metal hydroxide being added after the alkali metal carbonate has had sufficient time to react and form a floc precipitate.

13. A process according to claim 11, wherein the total hardness of the purified brine is approximately 50 ppm expressed as ppm calcium.

14. A process according to claim 11, wherein said salt brine contains from 20 to 500 ppm of magnesium ions and from 20 to 5,000 ppm of calcium ions.

15. A process according to claim 11, wherein the salt brine is treated with the alkali metal carbonate for a period of 40 to 60 minutes before the addition of the alkali metal hydroxide and thereafter the resulting admixture is agitated and allowed to further react for a period of 5 to 10 minutes.

16. A process according to claim 11, wherein the floc precipitate formed after addition of both the alkali metal carbonate and the alkali metal hydroxide has a particle size of from 0.45 to 1.0 micron.

17. A process according to claim 11, wherein the alkali metal carbonate is soda ash and the alkali metal hydroxide is caustic soda.

18. A process according to claim 11, wherein said treatment with the alkali metal carbonate and then with the alkali metal hydroxide forms said filterable floc precipitate particles within a period of not more then two hours after introduction of said alkali metal carbonate into said saturated salt brine.

19. A process for the purification of a raw salt brine having magnesium and calcium hardness which comprises introducing a predetermined amount of saturated raw brine containing from 20 to 500 ppm of magnesium ions and from 20 to 5000 ppm of calcium ions into a treatment tank; adding soda ash to the raw brine in an amount in excess of stoichiometric to react with the calcium ions and to form a first floc precipitate; admixing caustic soda with the contents of the treatment tank in an excess of stoichiometric to react with the magnesium ions and to form a second precipitate that combines with the first precipitate thereby forming a firm floc within the tank that settles easily, the contents of the treatment tank being agitated during the addition of the soda ash and caustic soda to cause the precipitated calcium and magnesium ions in the form of a filterable floc to suspend throughout the raw saturated brine; and thereafter directly passing the resulting suspension from said treatment tank via conduit means through at least one filtering unit wherein the suspended filterable floc is removed from the brine and a resultant purified brine is obtained; from 0.6 g/l to 1.0 g/l of the soda ash being added in excess of stoichiometric proportions of the calcium ions to said salt brine and from 1.0 g/l to 2.0 g/l of the caustic soda being added in excess of stoichiometric proportions of said magnesium ions to said salt brine whereby said filterable floc precipitate particles can be formed within a period of not more than two hours after introduction of said soda ash into said saturated salt brine.

20. A process according to claim 19, wherein said filterable floc precipitate particles are formed within a period of not more than two hours after introduction of said soda ash into said saturated salt brine.

21. A process according to claim 19, wherein said soda ash is admixed with the raw saturated brine for a period of from 40 to 60 minutes before the addition of the caustic soda and thereafter the resulting admixture is agitated and allowed to further react for a period of from 5 to 10 minutes.

* * * * *